United States Patent [19]

Harris et al.

[11] Patent Number: 5,481,723
[45] Date of Patent: Jan. 2, 1996

[54] SYSTEM AND METHOD FOR CONTROLLING EXECUTION OF NESTED LOOPS IN PARALLEL IN A COMPUTER INCLUDING MULTIPLE PROCESSORS, AND COMPILER FOR GENERATING CODE THEREFORE

[75] Inventors: Kevin W. Harris, Nashua; William B. Noyce, Hollis, both of N.H.

[73] Assignee: Digital Equipment Corporation, Maynard, Mass.

[21] Appl. No.: 395,275

[22] Filed: Feb. 27, 1995

Related U.S. Application Data

[63] Continuation of Ser. No. 555,660, Jul. 18, 1990, abandoned, which is a continuation of Ser. No. 226,257, Jul. 29, 1988, abandoned.

[51] Int. Cl.$^6$ ..................................................... G06F 9/45
[52] U.S. Cl. ................... 395/700; 364/280.4; 364/280.5; 364/DIG. 1
[58] Field of Search ........................ 364/DIG. 1, DIG. 2; 395/600, 700, 800

[56] References Cited

U.S. PATENT DOCUMENTS

| | | | |
|---|---|---|---|
| 4,468,736 | 8/1984 | De Santis et al. | 364/200 |
| 4,710,872 | 12/1987 | Scarborough | 364/300 |
| 4,794,521 | 12/1988 | Ziegler et al. | 364/200 |
| 4,829,427 | 5/1989 | Green | 364/300 |
| 4,833,606 | 5/1989 | Iwasawa et al. | 395/700 |
| 5,093,916 | 3/1992 | Karp et al. | 395/700 |

OTHER PUBLICATIONS

S. Midkiff, et al., "Compiler Algorithms for Synchronization," I.E.E.E. Transactions on Computers, vol. 3–36, No. 12 (Dec., 1987), pp. 1485–1495.

L. Lamport, "The Parallel Execution of Do Loops," Comm. ACM vol. 17, No. 2 (Feb. 1974), pp. 83–93.

D. Callahan, *A Global Approach to Detection of Parallelism* (1987) Ph. D. Thesis, Rice University (Rice COMP TR87-50, 9 Apr. 1987).

D. Reed, et al., "Synchronization With Eventcounts and Sequencers", Comm. ACM, vol. 22, No. 2 (Feb. 1979), pp. 115–123.

J. Gazdag & H.–H. Wang, Concurrent computing by sequential staging of tasks, IBM Systems Journal, vol. 28, No. 4, 1989, pp. 646–660.

Proceedings of the 1986 International Conference on Parallel Processing, 19th –22 Aug. 1986, pp. 544–551, IEEE, New York, US; S. P. Midkiff et al: "Compiler Generated Synchronization for DO Loops".

Primary Examiner—Thomas G. Black
Assistant Examiner—Maria N. Von Buhr
Attorney, Agent, or Firm—Denis G. Maloney; Arthur W. Fisher

[57] ABSTRACT

A system and method for controlling execution of nested loops in parallel in a computer including multiple processors, and a compiler for generating code therefor. The code enables the computer to operate in the following manner. Each processor processes an iteration of an outer loop in a set of nested loops. If the outer loop contains more iterations than processors in the system, the processors are initially assigned early iterations, and the later iterations are assigned to the processors as they finish their earlier iterations, until the processors have processed all of the iterations. Each processor, during processing of an outer loop iteration runs the iterations comprising the inner loop serially. In order to enforce dependencies between the loops, each processor reports its progress in its iterations of the inner loop to the processor executing the succeeding outer loop iteration. In addition, each processor, before processing the inner loop iterations of an assigned outer loop iteration, determines whether the processor computing the preceding outer loop is ahead or behind in processing its inner loop iteration by an amount which guarantees that dependencies will be enforced.

25 Claims, 4 Drawing Sheets

SYSTEM AND METHOD FOR CONTROLLING EXECUTION OF NESTED LOOPS IN PARALLEL IN A COMPUTER INCLUDING MULTIPLE PROCESSORS, AND COMPILER FOR GENERATING CODE THEREFORE

This application is a continuation of U.S. application Ser. No. 07/555,660, filed Jul. 18, 1990, which is a File Wrapper Continuation of U.S. patent application Ser. No. 07/226,257, filed Jul. 29, 1988, both entitled, SYSTEM AND METHOD FOR CONTROLLING EXECUTION OF NESTED LOOPS IN PARALLEL IN A COMPUTER INCLUDING MULTIPLE PROCESSORS, AND COMPILER FOR GENERATING CODE THEREFORE, both now abandoned.

The invention relates generally to the field of digital data processing systems, and more particularly to systems for enabling portions of a computer program to be executed in parallel by multiple processors in a digital data processing system.

Digital data processing systems including multiple processors have the potential for achieving significantly faster processing of a computer program by processing the program in parallel. Realizing the potential increase in processing speed, however, requires optimizing the programs processed by the processors. Programs originally written for sequential processing may not be directly transferable to a multiple processor system but often must be rewritten to take full advantage of the parallel architecture. It is desirable, therefore, to provide compiler programs which directly transform programs in such well known languages as, for example, Fortran, C or Pascal into versions directly compatible with the multiple processor architecture by, for example, inserting instructions to efficiently regulate processing by the various processors.

Initially, a programmer or compiler has to identify those parts of a program which can be run in parallel and still produce the same result as would be obtained if the computer were run on a single processor system. In a computer including a single processor, values calculated and stored in memory in earlier portions of a program are assured of being available for later portions of the program, in which the memory is read and values used in computation. If, however, the portions are processed in parallel in a computer system having multiple processors, the order of computation is, in general, unpredictable.

The important computer programming code structure known as the loop presents special difficulties in this regard. A loop calls for the iterative execution of the same series of program instructions until some termination criterion is satisfied. In order to ensure that the program, when executed in parallel, provides the same result as when executed serially, memory references must occur in the same order in the parallel version as they would in the serial version. For example, if a function in an iteration of a loop requires a result calculated during a previous iteration, the previous iteration must be performed first in the parallel processing scheme on multiple processors, although it would automatically occur in the proper order if a single processor were processing the program in a serial processing scheme.

Whenever there are two references to the same memory location, and at least one of the references is a write, a "dependence" exists between the two references, and they must occur in the proper order. The iteration which calculates a value to be called upon in another iteration is called the "source" of the dependence and the iteration which reads the value and uses it in a computation is referred to as a dependence "sink". If there is a dependence between two references that can occur in different iterations of a loop, as described above, that loop is said to "carry the dependence," and finally, if a result computed in one iteration of a loop depends on a value computed by that same statement in a preceding iteration of the loop, the dependence forms what is called a "recurrence". Loop structures which carry a dependence cannot run in parallel without special action, because the timing of processing of the iterations of a loop, when processed in parallel, is, as described above, often unpredictable.

Accounting for the presence of dependencies and recurrences carried by loop structures in programs executed in parallel on multiple processor systems becomes even further complicated by a loop which includes another loop as a programming step, since a dependence may involve a value calculated in another iteration of both the outer and inner loops. This structure is known as a nested loop.

Previous methods for making loop structures compatible with multiple processor systems fall into two broad classes. In the first, which includes techniques such as the Hyperplane Method and the Code Replication technique, the program is transformed in such a way that the resulting program contains loops that do not carry any dependencies. The Code Replication Technique cannot be used with loops which carry a recurrence.

The Hyperplane method has, however, proven capable of handling such dependencies, including those occurring in nested loop structures. In this technique, the outer loop of a nested loop structure is performed serially on each available processor and the inner loop is performed in parallel with certain iterations assigned to certain processors. Unfortunately, though, this method requires the execution of many loop start and resynchronization commands to assure the proper ordering of the computations. Such commands are inherently slow and thus prevent the multiple processors from being efficiently used. Furthermore, when implementing the Hyperplane technique, the processors are vulnerable to unpredictable delays, such as those due to page faults or preemption by higher priority users which tend to delay the execution of the program by the sum of the processor delays.

In the second class of techniques, the dependence is enforced by making one processor wait for another. These techniques, however, have been applied only to a single loop. In nested loops, the iterations comprising the inner loops are executed in parallel, with the iterations comprising the outer loop being executed serially. Alternatively, flags may be inserted into the data being processed to synchronize access thereto. However, the number of flags required would be on the order of the number of inner loop iterations times the number of outer loop iterations. Typical nested loops would in effect be run serially, because the system would wait for the entire inner loop to be completed on one processor before starting it on another processor.

SUMMARY OF THE INVENTION

The invention provides a new and improved system and method for processing a nested loop, including an outer loop structure and at least one inner loop structure, in connection with a computer having a plurality of processors, and a new and improved compiler for generating code therefor.

In brief summary, the invention, in one aspect, includes a system for processing a nested loop structure including an outer loop structure, to be processed in a plurality of outer loop iterations in parallel, and an inner loop structure to be processed in a plurality of inner loop iterations in series, the inner loop structure defining a computation defining a dependency. The system comprises a plurality of processors for performing processing operations and a control element. The control element comprises an outer loop element for enabling the processors to process the outer loop iterations in parallel, and an inner loop element, which, in turn, includes a wait element, a computation element, and a report element. The wait element enables each processor to perform a wait operation to delay until a processor performing a proximate outer loop iteration generates a report indicating that it has reached an inner loop iteration having a selected relationship with the inner loop iteration being performed by the processor, the relationship being selected to ensure satisfaction of the dependency. The computation element enables each processor to perform, following the wait operation, the computation for the inner loop iteration. The report element enables each processor to generate a report following the completion of the computation to identify the inner loop iteration whose computation was completed.

In another aspect, the invention provides a method of controlling a computer system comprising a plurality of processors to process a nested loop structure including an outer loop structure to be processed by the processors in a plurality of outer loop iterations in parallel, and an inner loop structure to be processed in a plurality of inner loop iterations by each processor in series, the inner loop structure defining a computation defining a dependency. The method comprises an outer loop step for enabling each processor to initiate processing of an outer loop iteration, and an inner loop step for enabling each processor to iteratively process inner loop iterations. The inner loop step, in turn, comprises a wait step, a computation step and a report step. The wait step enables each processor to perform a wait operation to delay until a processor performing a proximate outer loop iteration generates a report indicating that it has reached an inner loop iteration having a selected relationship with the inner loop iteration being performed by the processor. The computation step enables each processor to perform, following the wait operation, the computation for the inner loop iteration as defined by the inner loop structure. The report step enables each processor to generate a report following the completion of the computation to identify the inner loop iteration just completed by the processor.

In yet another aspect, the invention provides a compiler for compiling a nested loop structure including an outer loop structure to be processed by a plurality of processors in a plurality of outer loop iterations in parallel, and an inner loop structure to be processed in a plurality of inner loop iterations by each processor in series, the inner loop structure defining a computation defining a dependency. The compiler comprises an outer loop element for generating code for enabling each processor to process an outer loop iteration comprising at least one inner loop iteration, and an inner loop element. The inner loop element, in turn, includes a wait element, a computation element, and a report element. The wait element generates code for enabling each processor to perform a wait operation to delay until a processor performing a proximate outer loop iteration generates a report indicating that it has reached an inner loop iteration having a selected relationship with the inner loop iteration being performed by the processor. The computation element generates code for enabling each processor to perform, following the wait operation, the computation for the inner loop iteration as defined by the inner loop structure. The report element generates code for enabling each processor to generate a report following the completion of the computation to identify the inner loop iteration just completed by the processor.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DESCRIPTION OF AN ILLUSTRATIVE EMBODIMENT

1. General

Figure 1:
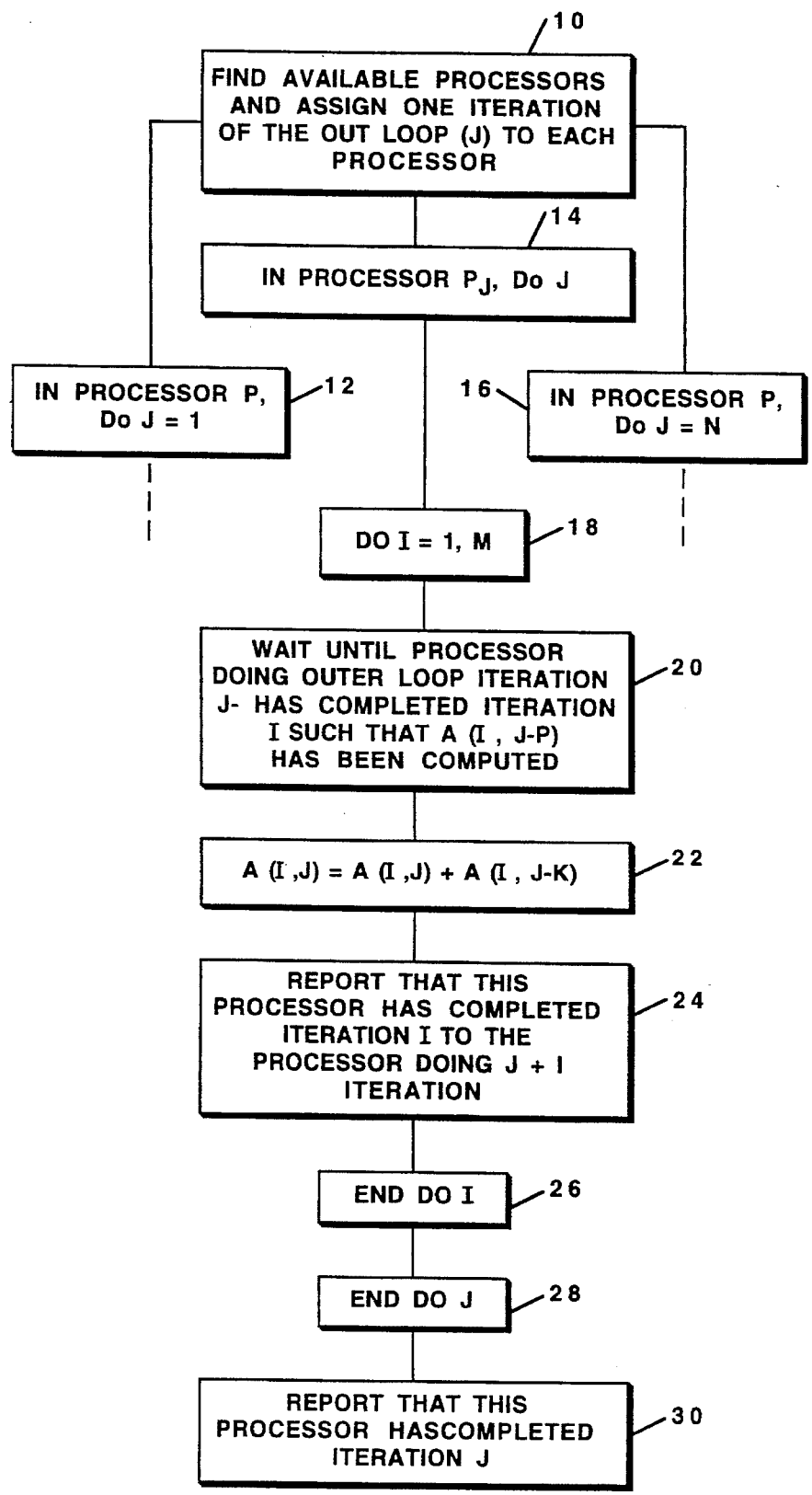
FIG. 1 is a flow diagram of the steps of the method of the invention for a simple example of a nested loop structure carrying a recurrence.

The invention provides a new system, which may comprise a compiler that, in compiling programs with nested loops, generates code which enables the programs to be executed in parallel by multiple processors in a digital data processing system. The resulting code enables the system to operate in the following manner. The compiler generates code that enables each processor to be assigned to process one iteration of an outer loop in a set of nested loops. If the outer loop contains more iterations than processors in the system, the processors are initially assigned the initial outer loop iterations and as each processor finishes processing its outer loop iteration, it is assigned the next unassigned outer loop iteration. The procedure continues until all of the outer loop iterations have been processed.

During processing of each outer Loop iteration, each processor runs the inner loop iterations serially. In order to enforce dependencies, each processor, after finishing processing of an inner loop iteration, reports its progress in processing the inner loop iteration to the processor executing the next succeeding outer loop iteration. That processor waits until the reporting processor is ahead by at least, or behind, by at most, a selected proximate outer loop iteration by a selected number of inner loop iterations. The number is determined by the number of inner loop iterations and number of outer loop iterations between the source and sink of the dependency, and is selected to guarantee that the dependency will be enforced.

The new method provides a nearly linear increase in computational speed. Furthermore, the method is relatively tolerant of the delays that can occur because of unequal work in the loop body or preemption in a time-sharing environment or interrupt processing. Delaying one processor does not hold up the entire program, but only those processors that execute succeeding outer loop iterations. Finally, a delay in another processor does not necessarily hold up the processor that was delayed first.

The invention may include a large number, corresponding at least to the number of outer loop iterations, of control structures to control and synchronize the operations of the processors processing the inner loop iterations, to facilitate reporting by the processors of their completion of the inner loop iterations for each outer loop iteration. In a second aspect of the invention, reporting is accomplished by control structures that depend on the number of processors, not the number of outer loop iterations. In the second aspect of the invention, the control structures include progress counters, each associated with a flag, the number of flags and progress counters being associated with the number of processors.

Each progress counter is incremented by a processor to indicate its progress in sequencing through the inner loop iterations of its assigned outer loop iteration. During processing of each outer loop iteration, prior to performing the computation defined by the inner loop iteration, the processor examines the progress counter being incremented by the processor processing the preceding outer loop iteration to determine whether it indicates that that processor has progressed sufficiently to permit it to process the inner loop iteration. If so, the processor performs the computation defined by the inner loop iteration, and increments its progress counter.

It will be appreciated that, at any given time, only two processors will be using any given progress counter, namely, the processor that examines the progress counter of the processor processing the preceding inner loop iteration, and the processor that increments its progress counter to report the inner loop iteration it has finished processing. When both processors have completed use of the progress counter, which does not occur until the examining processor has finished its inner loop iterations, the progress counter can be re-used for another outer loop iteration. Thus, the number of progress counters required is at least one plus the number of processors. The additional progress counter is initially provided for the processor processing the first outer loop iteration; that progress counter is initialized to a value that ensures that the processor processing the first outer loop iteration will be able to process all of the inner loop iterations comprising the first outer loop iteration.

In addition to the progress counters, the control structures include a done flag that indicates whether the progress counter can be re-used, and a last pointer indicates the first unavailable progress counter. When the processor that reports through a given progress counter is finished processing its inner loop iterations of an outer loop iteration, it increments the value in the progress counter to the highest possible value the counter can accommodate, so that a lesser value in the progress counter does not inhibit the examining processor from finishing its inner loop iterations. Further, when the examining processor finishes its inner loop iterations, so that it does not need to examine the progress counter further, it sets the done flag associated with the progress counter, indicating it can be re-assigned.

The progress counters are assigned in a circular manner, and so all preceding progress counters, up to the progress counter pointed to by the last counter, are available for re-assignment. As each examining processor finishes using a progress pointer and sets the associated done flag, it increments the last pointer to point to the next progress counter. Further, as each processor finishes processing an outer loop iteration, it is reassigned the next progress counter whose done flag is set, if the last pointer does not point to it.

DETAILED DESCRIPTION

FIG. 1 illustrates operations of the computer system with reference to the following code fragment containing a Fortran code structure known as a nested Do loop:

| | |
|---|---|
| Do J = 1,N | [1] |
|    Do I = 1,M | [2] |
|       A (I,J) = A(I,J) + A(I,J–P) | [3] |
|    End Do | [4] |
| End Do | [5] |

In this code fragment, the outer loop, identified with a loop index J, is defined by lines [1] and [5] calling for N outer Loop iterations from J=1 to J=N. For each iteration of the outer loop, lines [2] and [4] define an inner loop, identified by a loop index I, which has M inner loop iterations from I=1 to I=M.

Line [3] of the nested Do loop defines a computation which requires the value of a memory location A(I, J-P), that is, the value of the computation computed during the corresponding iteration I of the inner loop, during a previous iteration, namely iteration J-P, of the outer loop. The values computed during the outer loop iteration J-P are stored during those iterations in the same memory locations that are read during iteration J and used in inner loop computations during that outer loop iteration. Thus, the present Do loop structure carries a dependency, or rather two references, to each storage location, the first reference to write a result in a location that is read during the second reference by a later outer loop iteration and used in a computation in that later outer loop iteration. To process the code fragment in parallel on a computer system with multiple processors, the system must ensure that the processor processing outer loop iteration J-P has completed the iteration I of the inner loop to provide value A(I, J-P).

In the following description, it will be assumed that the nested Do loop will be processed in parallel, in a computer system having n+1 processors identified by $P_o$ through $P_n$. The value of "n" need not have any relation to "N", the number of outer loop iterations.

Figure 2:
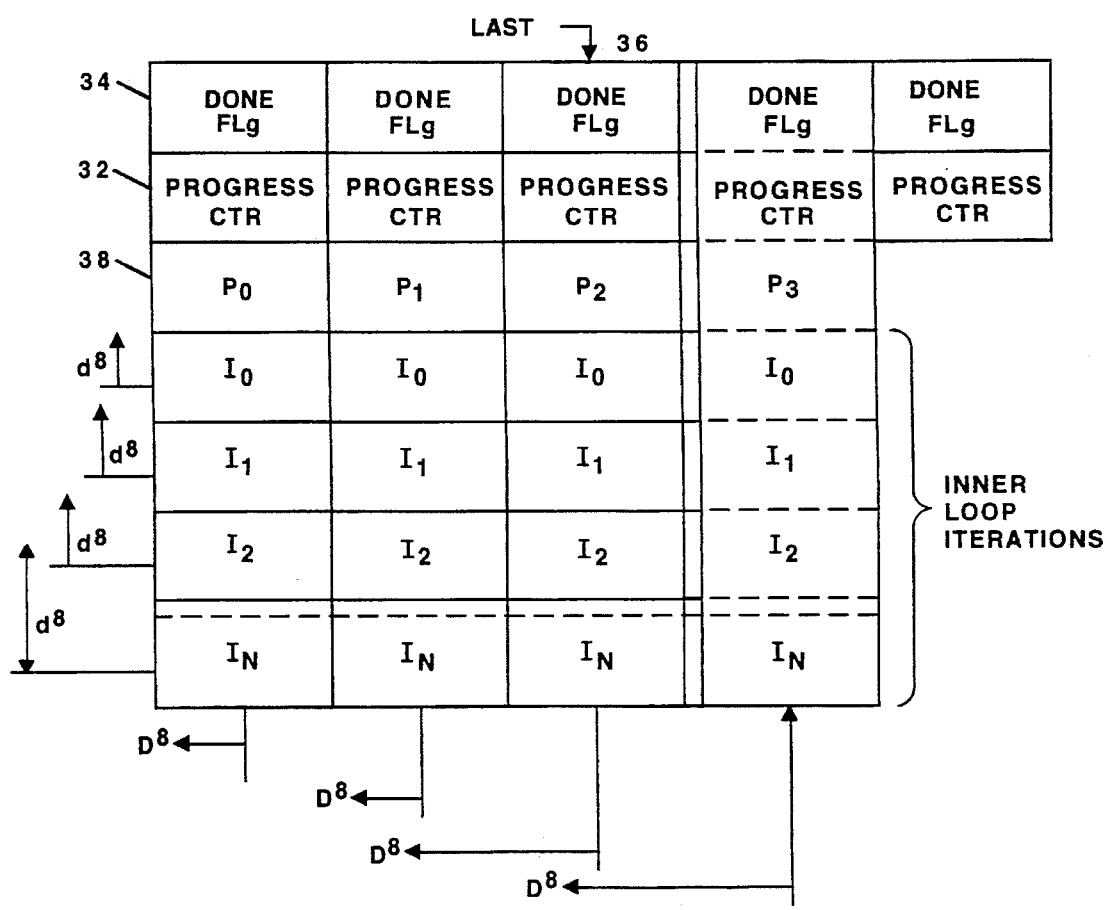
FIG. 2 is an illustration of multiple processors executing a nested loop structure according to the invention.

Referring now to FIGS. 1 and 2, the new compiler generates code that enables the processors to execute their assigned outer loop iterations in parallel, while ensuring that the dependencies are maintained. In Step 10, the code enables each processor $P_o$-$P_n$ to perform a single iteration of the outer loop. The code enables each processor $P_j$ (j=0 to n) to execute the inner loop iteration defined by (I), serially (steps 18 through 26) with each processor $P_j$ initially performing a wait step (step 20) until the processor processing the preceding outer loop iteration is ahead by at least, or behind by at most, a predetermined number of inner loop iterations. The processor then executes the inner loop computation (step 22), and reports that it has completed the iteration I to the processor performing the next outer loop iteration, namely iteration J+1 (step 24). After the processor $P_j$ has finished all of the inner loop iterations (step 26), it indicates (step 30) that it is free to run another outer loop iteration (step 30), and is assigned to run the next unassigned outer loop iteration, repeating steps 20, 22 and 24, or exits if all outer loop iterations have been assigned.

To facilitate the operation depicted in FIG. 1, the compiler generates code that enables establishment of various data structures depicted in FIG. 2. FIG. 2, depicts a plurality of processors $P_o$-$P_n$, generally identified by reference numeral 38, comprising a parallel processor system. The processors 38 process outer loop iterations in parallel, the processors processing all of the inner loop iterations serially. During an outer loop iteration, each processor 38 is assigned a progress counter 32 and an associated done flag 34. In the report operation (step 24), the processor 38 updates the assigned progress counter 32 after each inner loop iteration. The processor increments its progress counter 32 to its highest value upon completion of all of the inner loop iterations, which may occur after processing of all of the inner loop iterations or earlier if it determines that a termination criterion is met that enables it to exit the inner loop.

In the wait operation (step 20) the processor 38 examines the value of the progress counter 32 assigned to the processor 38 processing the immediately preceding outer loop iteration. An examining processor 38 uses the progress counter 32 to determine whether it is ahead of the reporting processor 38 by at least, or behind by at most, a predetermined number of inner loop iterations. The reporting processor, when it has finished its outer loop iteration, sets the value of the progress counter to the highest value so that a lesser value in the progress counter does not inhibit the processor 38 from finishing the inner loop iteration of its outer loop iteration. After it has finished processing its outer loop iteration, the processor 38 sets the done flag 34 associated with the progress counter 32 it was examining. In addition, the processor 38 conditions its progress counter 32 to its highest possible value.

As noted above, the data structure depicted in FIG. 2 contains at least one more progress counter 32 and done flag 34 than the number of processors 38. The progress counters 32 are effectively assigned to processors 38 in a circular manner. A pointer 36 is established that points to the progress counter 32 and done flag 34 which was last assigned to a processor 38. If the number of iterations of the outer loop is greater than the number of processors, the value of the last pointer 36, when incremented, modulo the number of processors plus one, points to the first unavailable done flag 34 and progress counter 32.

The code generated by the compiler enables each processor 38 to observe the progress of the processor performing the preceding outer loop iteration in its processing of inner loop iterations. Specifically, the code enables each processor 38 to observe the count of the progress counter 32 that is being updated by the processor 38 processing the immediately preceding outer loop iteration. During execution of a wait command (step 20) each processor delays until the processor processing the immediately preceding iteration of the outer loop is ahead by at least, or behind by at most, a selected number (K) of iterations in its processing of the inner loop iteration, with the number K being selected to ensure that any dependencies are satisfied.

To determine the value for K, the compiler generates distance vectors $(D_j, d_i)$ each associated with a dependence carried by the outer loop, where the vector component $D_j$ represents, for a given dependence, the number of outer loop iterations from one reference to a memory location to another reference to the same memory location, and vector component $d_i$ represents, for the same dependence, the distance between inner loop iterations between the same references. The sign of the vector component $D_j$ is positive if the outer loop dependence is to a preceding outer loop iteration and negative if it is to a succeeding outer loop iteration. Similarly, the sign of vector component $d_i$ is positive if the inner loop dependence is to a preceding inner loop iteration and negative if it is to a succeeding inner loop iteration. The distance vector components are indicated schematically in FIG. 2. For example, if the value A(J-1, I-2) is to be used in a computation in an inner loop, the distance vector is (+1,+2).

The value of $K_D$ for each dependence represents a number of inner loop iterations separating the inner loop iteration being processed by a given processor and the inner loop iteration being processed by the processor processing the immediately preceding outer loop iteration. The value of $K_D$ is selected to ensure that, as each processor $P_j$ 38 is performing a computation which uses a value computed during another iteration, the required value has already been computed. Further, the value $K_D$ is selected so that the processor $P_j$ 38 need only determine from the progress counter 32 associated with the processor 38 processing the immediately preceding outer loop iteration that the dependence is satisfied.

If the dependence vector $(D_j, d_i)$ associated with the dependence has a component $D_j$ with a positive value, that is, if the component $D_j$ identifies a dependence to a preceding outer loop iteration, and a component $d_i$ with a positive value, that is if the component $d_i$ identifies a preceding inner loop iteration, it will be appreciated that the processor processing an outer loop iteration can get ahead of the processor performing the preceding outer loop iteration by an amount corresponding to the number of inner loop iterations between the inner loop iteration in which the value giving rise to the dependence is computed and the inner loop iteration in which it is used. However, to enable the processor to only have to observe the progress of the processor processing the immediately preceding outer loop iteration, the dependence is enforced if the processor is permitted to get ahead of the processor processing the immediately preceding outer loop iteration by a number of inner loop iterations corresponding to the greatest integer resulting from the division of the value of $d_i$ by the value of $D_j$. Since each of the processors 38 will be permitted to process an inner loop iteration in advance of its being processed by the processor processing the immediately preceding inner loop iteration, the sum of the amounts of the advancements permitted between the processor 38 that uses the value will ensure that the dependence is enforced.

Similarly, if the dependence vector $(D_j, d_i)$ associated with the dependence has a component $D_j$ with a positive value, that is, if the component $D_j$ identifies a dependence to a preceding outer loop iteration, and a component $d_i$ with a zero or negative value, that is, if the component $d_i$ identifies the same or a succeeding inner loop iteration, the processor processing an outer loop iteration will need to delay behind the processor performing the preceding outer loop iteration by an amount corresponding to the number of inner loop iterations between the inner loop iteration in which the value giving rise to the dependence is computed and the inner loop iteration in which it is used. However, to enable the processor to only have to observe the progress of the processor processing the immediately preceding outer loop iteration, the dependence is enforced if the processor is forced to delay behind the processor processing the immediately preceding outer loop iteration by a number of inner loop iterations corresponding to the greatest integer resulting from the division of the value of d, by the value of $D_j$. Since each of the processors 38 will be forced to delay processing of an inner loop iteration behind its being processed by the processor processing the immediately preceding inner loop iteration by the same amount, the sum of the amounts of the advancements permitted between the processor 38 that computes the value and the processor 38 that uses the value will ensure that the dependence is enforced.

On the other hand, if the dependence vector $(D_j, d_i)$ associated with the dependence has a component $D_j$ with a negative value, that is, if the component $D_j$ identifies a dependence to a succeeding outer loop iteration, and a component $d_i$ with a positive value, that is, if the component $d_i$ identifies a preceding inner loop iteration, it will be appreciated that the processor processing an outer loop iteration can get ahead of the processor performing the succeeding outer loop iteration by an amount corresponding to the number of inner loop iterations between the inner loop iteration in which the value giving rise to the dependence is computed and the inner loop iteration in which it is used. However, to enable the processor to only have to observe the progress of the processor processing the immediately preceding outer loop iteration, the dependence is enforced if the processor is permitted to get ahead of the processor processing the immediately preceding outer loop iteration by a number of inner loop iterations corresponding to the greatest integer resulting from the division of the value of $d_i$ by the value of $D_j$. Since each of the processors 38 will be permitted to process an inner loop iteration in advance of its being processed by the processor processing the immediately preceding inner loop iteration, the sum of the amounts of the advancements permitted between the processor 38 that computes the value and the processor 38 that uses the value will ensure that the dependence is enforced.

Finally, if the dependence vector $(D_j, d_i)$ associated with the dependence has a component $D_j$ with a negative value, that is, if the component $D_j$ identifies a dependence to a succeeding outer loop iteration, and a component $d_i$ with a zero or negative value, that is, if the component $d_i$ identifies the same or a succeeding inner loop iteration, the processor processing an outer loop iteration will need to delay behind the processor performing the succeeding outer loop iteration by an amount corresponding to the number of inner loop iterations between the inner loop iteration in which the value giving rise to the dependence is computed and the inner loop iteration in which it is used. However, to enable the processor to only have to observe the progress of the processor processing the immediately preceding outer loop iteration, the dependence is enforced if the processor is forced to delay behind the processor processing the immediately preceding outer loop iteration by a number of inner loop iterations corresponding to the greatest integer resulting from the division of the value of $d_i$ by the value of $D_j$. Since each of the processors 38 will be forced to delay processing of an inner loop iteration behind its being processed by the processor processing the immediately preceding inner loop iteration by the same amount, the sum of the amounts of the advancements permitted between the processor 38 that computes the value and the processor 38 that uses the value will ensure that the dependence is enforced.

Thus, if the value $K_D$ represents, for a given dependency, a minimum delay factor, that is, the minimum difference between the inner loop iteration being processed by a processor $P_j$ 38 and the processor 38 processing the immediately preceding outer loop iteration, the value of $K_D$ is the minimum greatest integer value which satisfies the following relations:

$K_D * D_j + d_i \geq 0$ if $D_j$ is positive, or $K_D * D_j + d_i \leq 0$ if $D_j$ is negative.

It will be appreciated that, if the inner loop computations contain multiple dependencies, the compiler determines a value of $D_j$ for each dependency as described above, and selects as K its largest $K_D$.

Figure 3:
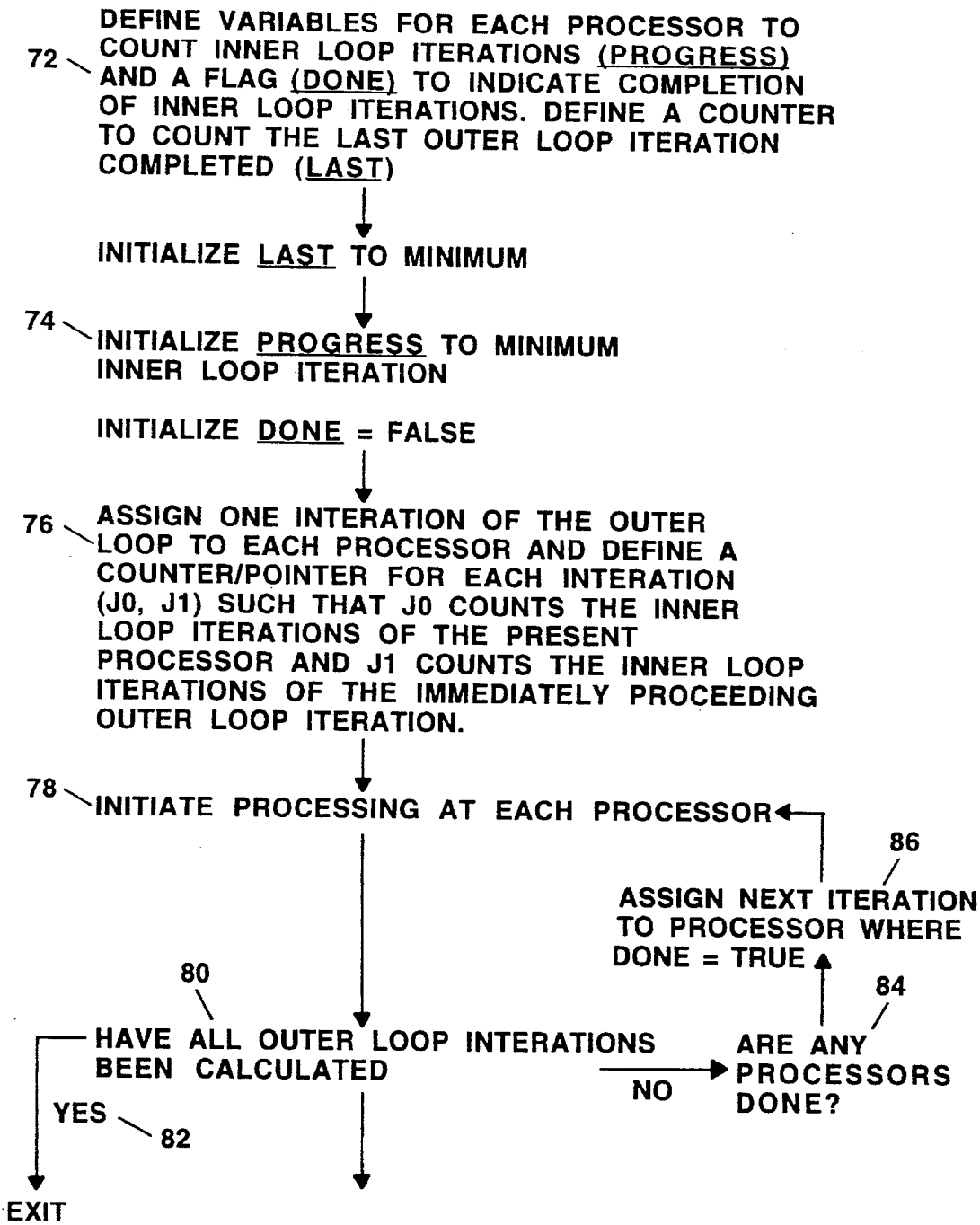
FIG. 3 is a flow diagram of the processor control functions according to the invention.
Figure 4:
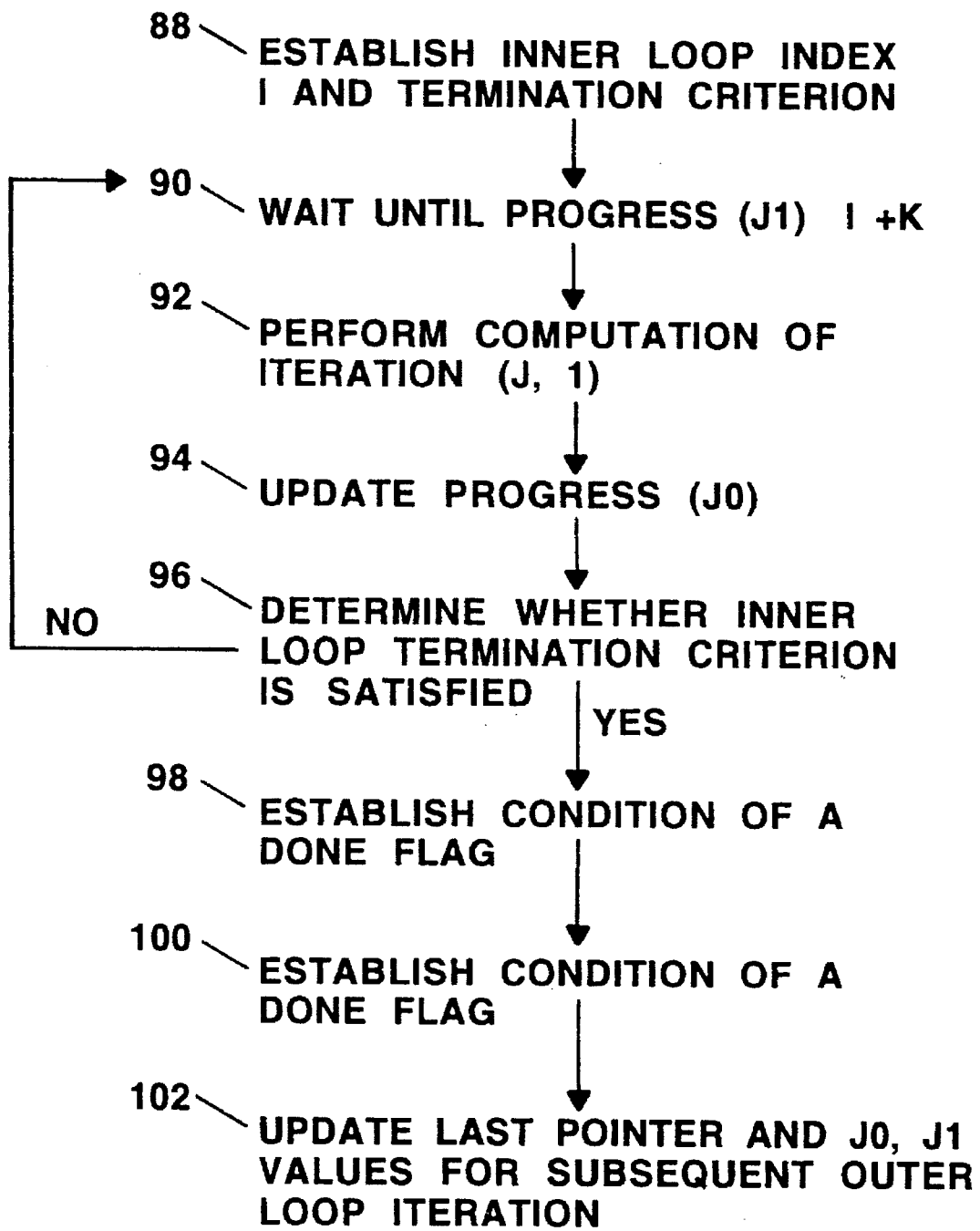
FIG. 4 is a flow diagram of the steps of the method executed at each processor.

FIGS. 3 and 4 detail the operations performed by the processors $P_o$-$P_n$ 38 in processing a nested loop structure in connection with the progress counters 32, done flags 34 and last pointer 36 described above in connection with FIG. 2.

Referring now to FIG. 3, the code generated by its compiler enables establishment of the progress counters 32 (FIG. 2) and associated done flags 34 (FIG. 2) and the last pointer 36. The control processor first initializes these structures (step 74), and assigns the first sequential outer loop iterations to the processors $P_o$-$P_n$ (step 76). In that operation, each processor $P_o$-$P_n$ 38 receives a control value J0 and J1. The value J0 identifies the outer loop iteration being processed by the processor $P_i$ and value J1 identifies the outer inner loop iteration being processed by the processor 38 performing the immediately preceding outer loop iteration.

After all the processors have been assigned outer loop iterations, they begin processing in unison (step 78), performing the operations described below in connection with FIG. 4. As each processor 38 finishes the outer loop iteration, it determines whether all of the outer loop iterations have been calculated (step 80). If so, the computations of the program are complete (step 82) and the processor 38 exits. However, if the processor 38 determines in step 80 that all outer loop iterations have not been processed, it selects a progress counter 32 associated with the done flag 34 unless pointed to by the last pointer 36, and begins processing the next unprocessed outer loop iteration. If the progress counter 32 is pointed to by the last pointer 36, the processor waits until the last pointer 36 is incremented to point to a subsequent progress counter 32, before using the first progress counter.

FIG. 4 depicts the operations performed by processor $P_i$ 38 in processing an outer loop iteration. The processor 38 first establishes inner loop index I and its termination criterion (step 88). The processor then performs a wait operation (step 90) examining the progress counter 32 that is being incremented by the processor 38 processing its outer loop iteration identified by the value J1, that is, the progress counter 32 associated with the processor computing the immediately preceding outer loop iteration, to determine when it has completed its inner loop iterations at least through iteration I+K, which ensures that all dependencies have been satisfied as described above. Upon meeting this condition, the processor performs the inner loop computation (step 92) and updates its progress counter 32. The effect of this update operation is to report its progress to the processor processing the immediately succeeding iteration of the outer loop. The processor $P_i$ 38 then tests the termination criterion. If the inner loop termination criterion is not met (step 96), the processor returns to step 90 to begin computation of the next inner loop iteration.

On the other hand, if the processor $P_j$ 38 determines, in step 96, that the inner loop termination criterion has been satisfied, it sets the progress counter 32 it is using to report to its maximum possible value. In addition, if K is positive, it sets the done flag 34 (step 98) associated with the progress counter it is examining and if K is negative it sets the done flag associated with the progress counter 32 it is using to report, thereby indicating that the progress counter is available for assignment (step 100). The processor $P_i$ 38, then updates the last pointer 36 and the values J0 and J1, for the next outer loop iteration (step 102).

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. A method of compiling a nested loop program structure including an outer loop structure to be processed by a plurality of processors operating in parallel, each of said processors assigned to process a selected one of a plurality of outer loop iterations, and further including an inner loop structure to be processed in a plurality of inner loop iterations, the inner loop iterations corresponding to each said outer loop iteration being processed in series by the processor assigned to process the corresponding outer loop iteration, wherein at least one of the inner loop iterations is dependent upon a computation of another of the inner loop iterations in a preceding iteration of the outer loop iterations, the method comprising the steps, performed in a data processing system, of:

A) extracting the outer loop structure from the nested loop structure;

B) extracting the inner loop structure from the nested loop structure;

C) generating a plurality of control structures each for enabling a corresponding one of said processors to perform a current outer loop iteration of the outer loop iterations and at least a current inner loop iteration of the inner loop iterations, each said control structure comprising a progress counter providing a count representing a number of inner loop iterations performed by the processor corresponding to said counter, said control structures enabling a current processor of the plurality of processors to perform the substeps of:

i) waiting until a previous processor of the plurality of processors, performing a previous outer loop iteration that precedes the current outer loop iteration being performed by the current processor, generates a waiting report value indicating that the previous processor has completed performance of an inner loop iteration upon which the current inner loop iteration being performed by the current processor depends;

ii) after the waiting step, performing the current inner loop iteration as defined by the inner loop structure; and iii) after the performing step, generating a next report value to indicate to a next processor of the plurality of processors that the current inner loop iteration has been completed by the current processor;

D) wherein the waiting report value and the next report value are generated in response to the counts of the counters corresponding respectively to the previous processor and to the current processor.

2. The method according to claim 1 wherein the second generating step further includes the substeps of:

determining whether a number identifying the current inner loop iteration from among the plurality of inner loop iterations is less than the report value minus a dependency distance, and wherein the waiting substep comprises the substep of:

waiting at times when the number identifying that current inner loop iteration is not less than the report value minus the dependency distance.

3. The method of claim 1 further comprising the step of:

generating a control structure to enable the current processor to establish a control data structure for receiving the report value from a previous processor.

4. The method of claim 3 further comprising the step of:

generating a control structure to enable the previous processor to transmit the report value to the control data structure corresponding to the current processor.

5. The method according to claim 3 wherein a total number of control data structures is equal to the number of processors plus one.

6. The method in accordance with claim 1, wherein the control structure generating step generates a plurality of control structures, each of the control structures corresponding to a different one of the processors during performance by the corresponding processors of the current outer loop iterations and the current inner loop iterations.

7. The method in accordance with claim 6, further including the step of generating a done flag for indicating that the current processor has completed performance of the current outer loop iteration and therefore that the counter corresponding to the current processor can be allocated to another of the processors.

8. The method in accordance with claim 6 for incrementing the count of the counter allocated to the current processor to indicate that the current processor has completed performance of the current outer loop iteration.

9. The system of claim 8 wherein the outer loop structure includes a condition expression corresponding to a predetermined number of outer loop iterations which determines the number of outer loop iterations that each processor will perform.

10. The system of claim 9 wherein the inner loop structure includes a condition expression corresponding to a predetermined number of inner loop iterations which determines the number of inner loop iterations to be processed and which has a value equal to or greater than the dependency distance.

11. The system of claims 8 wherein the inner loop structure includes a condition expression corresponding to a predetermined number of inner loop iterations which determines the number of inner loop iterations to be processed and which has a value equal to or greater than the dependency distance.

12. The system of claim 8 further comprising:

means for generating code for enabling the current processor to establish a control data structure for receiving the report value from the previous processor.

13. The system of claim 12 further comprising: means for generating code for enabling the previous processor to transmit the report value to the control data structure corresponding to the current processor.

14. The system of claim 12 wherein a total number of control data structures is equal to the number of processors plus one.

15. The method in accordance with claim 1, wherein the waiting report value identifies the inner loop iteration upon which the current inner loop iteration being performed by the current processor depends from among the plurality of inner loop iterations.

16. The method in accordance with claim 1, wherein the control structure enables the current processor to perform the further substep of determining, using the generated report value, whether a dependency distance is satisfied.

17. The method in accordance with claim 1, further comprising storing the waiting report value in the control structure corresponding to the previous processor, and storing the next report value in the control structure corresponding to the current processor.

18. A method of compiling a nested loop program structure including an outer loop structure to be processed by a plurality of processors operating in parallel, each of said processors assigned to process a selected one of a plurality of outer loop iterations, and further including an inner loop structure to be processed in a plurality of inner loop iterations, the inner loop iterations corresponding to each said outer loop iteration being processed in series by the processor assigned to process the corresponding outer loop iteration, one of the inner loop iterations is dependent upon a computation another of the inner loop iterations in a preceding iteration of the outer loop iterations, said one inner loop iteration occurring a number of inner loop iterations after said another inner loop iteration, and wherein a dependency distance is used to measure a number of inner loop iterations between said one inner loop iteration and said another inner loop iteration, the method comprising the steps, performed in a data processing system, of:

extracting the outer loop structure from the nested loop structure;

extracting the inner loop structure from the nested loop structure;

analyzing the extracted outer loop structure and the extracted inner loop structure to determine the dependency distance;

generating control structure means for enabling each processor to perform a current outer loop iteration, wherein the current outer loop iteration is one of the outer loop iterations, and at least a current inner loop iteration, said control structure means enabling allocation of a different one of a plurality of counters to each of the processors including a current processor and a previous processor, each said counter for providing a count representing a number of inner loop iterations performed by the processor to which the counter is allocated, said control structure means enabling a current processor of the plurality of processors to perform the substeps of:

i) responsive to the dependency distance, waiting until a previous processor of the plurality of processors, performing a previous outer loop iteration, generates a waiting report value indicating that the previous processor has performed the second inner loop iteration and identifying the second inner loop iteration from among the plurality of inner loop iterations, wherein the first inner loop iteration is to be performed by the current processor performing the current outer loop iteration;

ii) after the waiting step, performing said first inner loop iteration as defined by the inner loop structure; and iii) after the performing step, generating a next report value to indicate to a next processor that the first inner loop iteration has been performed by the current processor; the waiting report value and the next report value being generated in response to the counts of the counters allocated respectively to the previous processor and to the current processor.

19. A method of executing a nested loop program structure including an outer loop structure and an inner loop structure, the method comprising the steps, performed by the data processing system, of:

A) extracting the outer loop structure and the inner loop structure from the nested loop structure, wherein said outer loop structure can be processed by a plurality of processors operating in parallel;

B) assigning each processor at least a corresponding current iteration included in a plurality of iterations of the outer loop structure, and, for processing in series, a plurality of iterations of the inner loop structure, wherein at least one of the inner loop iterations is dependent upon a computation of another of the inner loop iterations in a preceding iteration of the outer loop iterations;

C) generating a plurality of progress counters each for use by a corresponding one of said processors during processing of the inner loop iterations assigned to said corresponding processor, each said progress counter providing a count representing a number of inner loop iterations performed by the corresponding processor;

D) a current processor of the plurality of processors performing the substeps of:

i) waiting until a previous processor of the plurality of processors, performing a previous outer loop iteration that precedes the current outer loop iteration being performed by the current processor, generates a waiting report value indicating that the previous processor has completed performance of an inner loop iteration upon which a current one of the inner loop iterations being performed by the current processor depends;

ii) after the waiting step, performing a current one of the assigned inner loop iterations; and iii) after the performing step, generating a next report value to indicate to a next processor of the plurality of processors that the current inner loop iteration has been completed by the current processor;

E) wherein the waiting report value and the next report value are generated in response to the counts of the counters corresponding respectively to the previous processor and to the current processor.

20. The method in accordance with claim 19, further comprising the step of using a dependency distance to measure a number of inner loop iterations between said one and said other of said inner loop iterations having said dependency, and, wherein said waiting step comprises the steps of:

i) determining whether a number identifying the current inner loop iteration is less than the waiting report value minus the dependency distance, and ii) waiting at times when the number identifying the current inner loop iteration is not less than the waiting report value minus the dependency distance.

21. The method in accordance with claim 19, further including the step of generating a done flag for indicating that the current processor has completed performance of the current outer loop iteration and therefore that the progress counter corresponding to the current processor can be allocated to another of the processors.

22. The method in accordance with claim 21 for incrementing the count of the progress counter allocated to the current processor to indicate that the current processor has completed performance of the current outer loop iteration.

23. The method in accordance with claim 19, wherein the report value identifies the inner loop iteration upon which the current inner loop iteration being performed by the current processor depends from among the plurality of inner loop iterations.

24. The method in accordance with claim 19, wherein the progress counters enable the current processor to perform the further substep of determining, using the generated waiting report value, whether a dependency distance is satisfied.

25. The method in accordance with claim 19, further comprising storing the waiting report value in a control structure associated with the progress counter corresponding to the previous processor, and storing the next report value in a control structure associated with the progress counter corresponding to the current processor.

* * * * *